E. M. LUSK.

ATTACHMENT FOR SEED PLANTERS.

APPLICATION FILED MAR. 31, 1915.

Reissued Aug. 17, 1915. 13,962.

Witnesses

Stuart Hilder.

Frances M. Anderson.

Inventor

Eli M. Lusk.

By E. W. Anderson & Son his Attorneys

COLUMBIA PLANOGRAPH CO., WASHINGTON, D. C.

UNITED STATES PATENT OFFICE.

ELI M. LUSK, OF KNOX CITY, TEXAS.

ATTACHMENT FOR SEED-PLANTERS.

Specification of Reissued Letters Patent. Reissued Aug. 17, 1915.

13,962.

Original No. 1,114,495, dated October 20, 1914, Serial No. 793,926. Application for reissue filed March 31, 1915. Serial No. 18,413.

*To all whom it may concern:*

Be it known that I, ELI M. LUSK, a citizen of the United States of America, and a resident of Knox City, in the county of Knox and State of Texas, have made a certain new and useful Invention in Attachments for Seed-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 3:
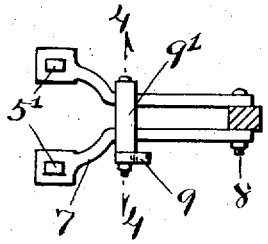
Figure 1:
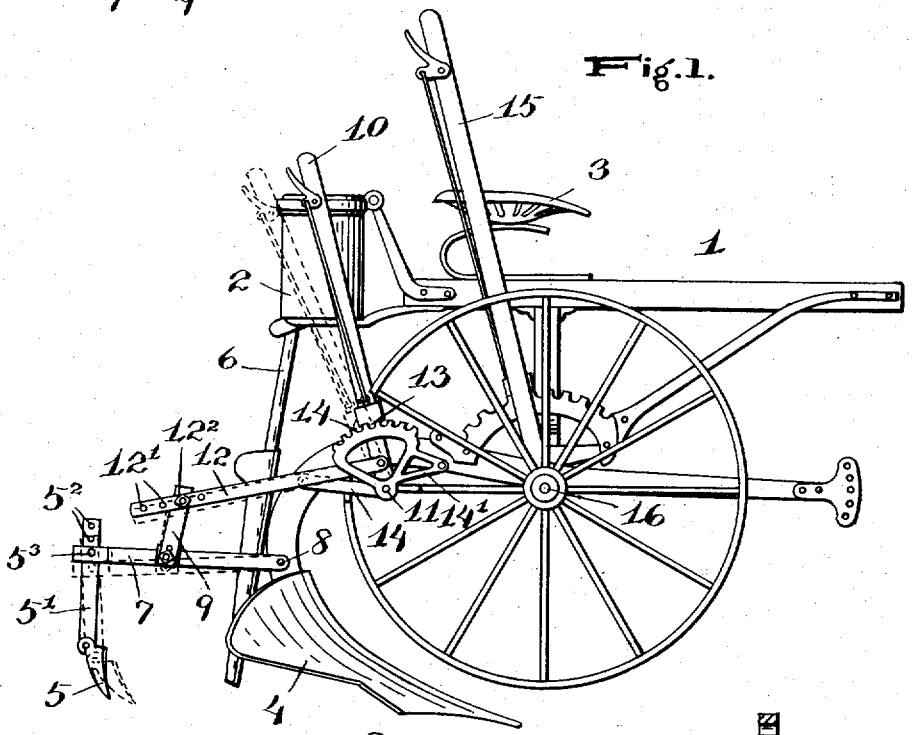
Figure 2:
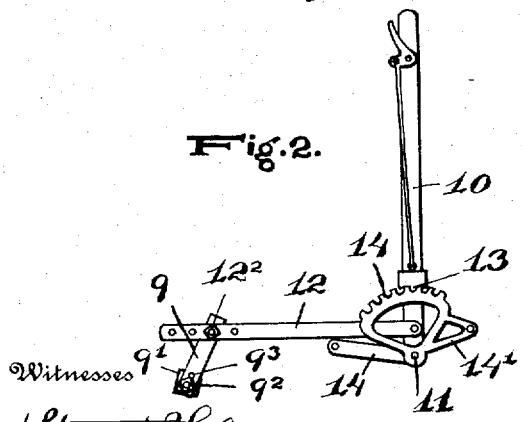
Figure 4:
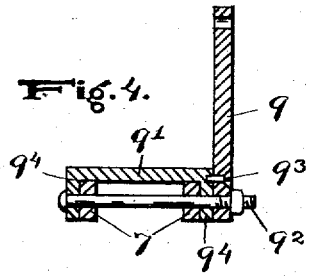

Figure 1 is a side view of the invention, as applied, with positions of parts, as adjusted in dotted lines. Fig. 2 is a side view of the invention alone. Fig. 3 is a detail plan view of the rear plow beams. Fig. 4 is a section on the line 4—4, Fig. 3.

The invention has relation to seed planters, and is designed for regulation of the depth of the small coverer plows in rear, by the driver, without dismounting from his seat.

The invention consists in the novel construction and combinations of parts, as hereinafter set forth.

In the accompanying drawings, illustrating the invention, the numeral 1 designates a seed planter of the type wherein the seed box is located in rear of the seat, said seat being placed well forward, over the main axle. The usual seed box 2, seat 3, main plow 4, small coverer plows 5 and seed chute or drill 6 are shown. The coverer plows 5 are carried at the rear ends of rearward extending frame arms 7, pivoted forwardly at 8 to the main beam, considerably in rear of the seat 3, and are adjusted by means of a lever 10, pivoted at its lower end at 11, close to the upper approximately horizontal portion of the main plow beam, and having a connecting rod 12 for raising and lowering the arms 7 upon pivot 8. The adjustment is held by engagement of the pawl 13 of the lever with the teeth of the arc bar 14. Because of the position of the lever 10, as governed by the location of the seat 3, over the main plow 4, it is advisable to keep its lower pivotal end 11 well raised, close to the beam, well above the pivot 8, to avoid interference with the action of the plow. And in order to give a proper degree of movement to the coverer plows in their adjustment and to retain proper leverage by pivoting the rod 12 to the lever 10 at a point close to the pivot 11, an upward extending frame arm 9 is rigidly secured to the arm 7 near its free end, the connecting rod being attached to the upper end of this arm 9 and having an angular relation of substantially 90 degrees to the lever 10.

The vertical stems 5′ of the coverer plows 5 are adjustably secured in seats of the pivotal arms 7, in the usual manner, by means of bolts $5^3$ engaging any one of a series of perforations $5^2$ of said stems, this adjustment in the present case serving to increase the range of adjustment of covered plows 5, from the seat, by means of lever 15. The connecting rod 12 is also adjustably secured to the upper end of arm 9, by means of a bolt $12^2$, having engagement with any one of a series of perforations 12′ of said connecting rod, said rod being thus capable of being secured in the proper angular relation to lever 15, previously stated. It is designed to provide an attachment having the advantages stated and which may be readily connected both to the pivotal arms 7, carrying the coverer plows, and to the plow beam. To this end the rack bar 14 is provided, preferably, with forward and rearward extending brace arms 14′, adapted for connection at their free ends with the plow beam upon opposite sides of the rack, to hold it securely in place close to the upper approximately horizontal portion of the beam, and the transverse bar 9′ is provided with downturned ends $9^4$, to embrace the arms 7, and perforated for the transverse bolt $9^2$, the upward extending arm 9 being rigidly secured to one of said downturned ends by pin $9^3$. In this way, in making the connection, it is only necessary to bolt the rack bar 14 in place and to secure the transverse bar 9′ to the arms 7.

When the front plow is adjusted for depth, by operation of the lever 15, to turn the crank axle 16 in the usual way, the rear plows will be simultaneously adjusted for depth, the special adjustment of my invention allowing for this.

By the use of my invention, it is not necessary for the team to be stopped when the special or independent adjustment of the rear plows is to be made, time being saved in this way, and plowing in uneven ground being accomplished more satisfactorily.

The lever 10 is smaller than the main lever 15, and located in rear of the same, behind the seat, so that it will not interfere with operation of the main lever.

What I claim is:

1. In a lister plow, the combination with a frame carrying a seat, and a plow beam with a seed box in rear of the seat and rearwardly extending arms pivoted to said beam and carrying coverer plows, of an attachment comprising a rack bar secured in place close to the upper approximately horizontal portion of the plow beam, a lever pivoted to said rack bar and having a pawl connection therewith, an upward extending arm having means of rigid detachable connection with said pivotal arms, and a connecting rod between said lever and the upper end of said upward extending arms.

2. In a lister plow, the combination with a frame carrying a seat, and a plow beam with a seed box in rear of the seat and rearwardly extending arms pivoted to said beam and carrying coverer plows, of an attachment comprising a rack bar secured in place close to the upper approximately horizontal portion of the plow beam, a lever pivoted to said rack bar and having a pawl connection therewith, a rod having at one end connection with said lever near the pivot thereof, and an upward extending arm having means of rigid detachable connection with said pivotal arms and lengthwise adjustable connection with the other end of said rod.

3. In a lister plow, the combination with a frame carrying a seat, and a plow beam with a seed box in rear of the seat and rearwardly extending arms pivoted to said beam and carrying coverer plows, of an attachment comprising a rack bar having forward and rearward extensions for connection with the upper horizontal portion of the plow beam close thereto, a lever pivoted to said rack bar and having a pawl connection therewith to fix the adjustment, an upward extending arm having means of rigid detachable connection with said pivotal arms, and a connecting rod between said lever and the upper end of said upward extending arm.

In testimony whereof, I affix my signature in presence of two witnesses.

ELI M. LUSK.

Witnesses:

J. A. McManners,
W. S. Shaw.

Copies of this patent may be obtained for five cents each, by addressing the "Commissioner of Patents, Washington, D. C."